US011777177B2

(12) United States Patent
Nohara et al.

(10) Patent No.: US 11,777,177 B2
(45) Date of Patent: Oct. 3, 2023

(54) ASSEMBLED BATTERY

(71) Applicant: Nippon Telegraph and Telephone Corporation, Tokyo (JP)

(72) Inventors: Masaya Nohara, Atsugi (JP); Mikayo Iwata, Atsugi (JP); Masahiko Hayashi, Atsugi (JP); Takeshi Komatsu, Atsugi (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 99 days.

(21) Appl. No.: 16/968,462

(22) PCT Filed: Feb. 14, 2019

(86) PCT No.: PCT/JP2019/005340
§ 371 (c)(1),
(2) Date: Aug. 7, 2020

(87) PCT Pub. No.: WO2019/160035
PCT Pub. Date: Aug. 22, 2019

(65) Prior Publication Data
US 2020/0403213 A1  Dec. 24, 2020
US 2022/0158147 A2  May 19, 2022

(30) Foreign Application Priority Data
Feb. 15, 2018  (JP) ................. 2018-024678

(51) Int. Cl.
*H01M 50/50* (2021.01)
*H01M 50/103* (2021.01)
(Continued)

(52) U.S. Cl.
CPC ......... *H01M 50/50* (2021.01); *H01M 50/103* (2021.01); *H01M 50/209* (2021.01);
(Continued)

(58) Field of Classification Search
CPC ........ H01M 6/38; H01M 6/46; H01M 6/5044; H01M 50/547; H01M 50/548;
(Continued)

(56) References Cited

U.S. PATENT DOCUMENTS

2010/0221595 A1 * 9/2010 Murata ................ H01G 11/12
429/128
2012/0208096 A1 * 8/2012 Kuboki ................ H01M 4/382
429/405

FOREIGN PATENT DOCUMENTS

EP        2637236 A1 * 9/2013 .......... H01M 2/1061
JP     2010-061998 A     3/2010
JP     2013-074205 A     4/2013

* cited by examiner

*Primary Examiner* — Jonathan G Leong
*Assistant Examiner* — Katharine A Caughron
(74) *Attorney, Agent, or Firm* — Workman Nydegger

(57) ABSTRACT

Provided is an assembled battery in which a large number of flat batteries can be stacked easily. An assembled battery 1 includes stacked multiple flat batteries A, B, and C in the shape of an N-sided polygon (N is an integer of 3 or more). Each of the multiple flat batteries A, B, and C in the shape of the N-sided polygon has a positive-electrode terminal 21a and a negative-electrode terminal 61a that extend in different directions having 360°/N in between, and the multiple flat batteries A, B, and C are electrically connected in series. The assembled battery 1 also includes multiple N-sided polygonal separating films 71 and 72 disposed between each pair of adjacent ones of the stacked multiple flat batteries A, B, and C to insulate the flat batteries from one another.

19 Claims, 16 Drawing Sheets

(51) Int. Cl.
*H01M 50/553* (2021.01)
*H01M 50/548* (2021.01)
*H01M 50/291* (2021.01)
*H01M 50/209* (2021.01)
*H01M 50/588* (2021.01)

(52) U.S. Cl.
CPC ....... *H01M 50/291* (2021.01); *H01M 50/548* (2021.01); *H01M 50/553* (2021.01); *H01M 50/588* (2021.01)

(58) Field of Classification Search
CPC .. H01M 50/55; H01M 50/552; H01M 50/553; H01M 50/559; H01M 50/562; H01M 50/564; H01M 50/566; H01M 50/567; H01M 50/569; H01M 50/296; H01M 50/574; H01M 50/583; H01M 50/584; H01M 50/586; H01M 50/588; H01M 50/59; H01M 50/591; H01M 50/593; H01M 50/595; H01M 50/597; H01M 50/102; H01M 50/103; H01M 50/105; H01M 50/107; H01M 50/109; H01M 50/11; H01M 50/14; H01M 50/141; H01M 50/143; H01M 50/145; H01M 50/183; H01M 50/1537; H01M 50/1385
See application file for complete search history.

ASSEMBLED BATTERY

TECHNICAL FIELD

The present invention relates to assembled batteries connected flat-shaped batteries (hereinafter, flat batteries) in series.

BACKGROUND ART

As disposable primary batteries, alkaline batteries, manganese batteries, and lithium primary batteries have conventionally been used widely. Since these batteries contain rare metals and hazardous substances such as lithium, nickel, manganese, and cobalt, batteries made of materials with low environmental impact are being studied for the purpose of safety and easier disposal.

However, these low-environment-impact batteries have a problem that the battery voltage is lower than those of conventional batteries containing rare metals and the like. To address this, these batteries are configured and used as assembled batteries in which multiple batteries are connected in series to achieve a higher voltage (by forming assembled batteries).

An example of a known conventional assembled battery is disclosed in Patent document 1.

PRIOR ART DOCUMENT

Patent Document

Patent document 1: Japanese Patent Application Publication No. 2010-61998

SUMMARY OF THE INVENTION

Problem to be Solved by the Invention

Unfortunately with the configuration of the conventional assembled battery, in the case where the number of stacked batteries is large, multiple electrode terminals extending to the outside of the battery need to have an insulation treatment to prevent substances other than joined members from touching the electrode terminals. In addition, the electrode terminals of low-environment-impact batteries are made of carbon cloth, and hence, the electrode terminals need to be joined by heat seal using a heat sealer or the like.

In this process, if the assembled battery has a structure in which the electrode terminals of each battery extend from the same position as in conventional assembled batteries, the electrode terminals other than the ones to be connected need to be deformed. In this occasion, a large stress is exerted on the assembled battery, causing a problem of adversely affecting its reliability. In addition, to monitor each battery constituting the assembled battery, the electrode terminals of each battery need to be drawn out without causing a short circuit, but there is a problem that in the case where the positions of the electrode terminals are the same, it is difficult to draw out the electrode terminals.

In other words, there is a problem that since the electrode terminals of each battery constituting the assembled battery are at the same position, it is difficult to stack a large number of batteries.

The present invention has been made in light of this problem, and an objective thereof is to provide an assembled battery in which a large number of batteries can be stacked easily.

Means for Solving the Problem

An assembled battery according to an aspect of the present embodiment is summarized as an assembled battery including stacked multiple flat batteries in the shape of an N-sided polygon (N is an integer of 3 or more), in which each of the multiple flat batteries in the shape of the N-sided polygon has a positive-electrode terminal and a negative-electrode terminal that extend in different directions having $360°/N$ in between, and the multiple flat batteries are electrically connected in series.

An assembled battery according to another aspect of the present embodiment is summarized as an assembled battery including stacked M flat batteries (M is an integer of 3 or more) each having a same planar shape, in which each flat battery has a positive-electrode terminal and a negative-electrode terminal extending in different directions having an angle of $360°/M$ in between with respect to the center of the flat battery, and the flat batteries are electrically connected in series.

Effect of the Invention

The present invention makes it possible to provide an assembled battery in which a large number of flat batteries can be stacked easily because the positive-electrode terminal and the negative-electrode terminal extend in different angles.

MODE FOR CARRYING OUT THE INVENTION

Hereinafter, embodiments of the present invention will be described with reference to the drawings.

First Embodiment

Figure 1:
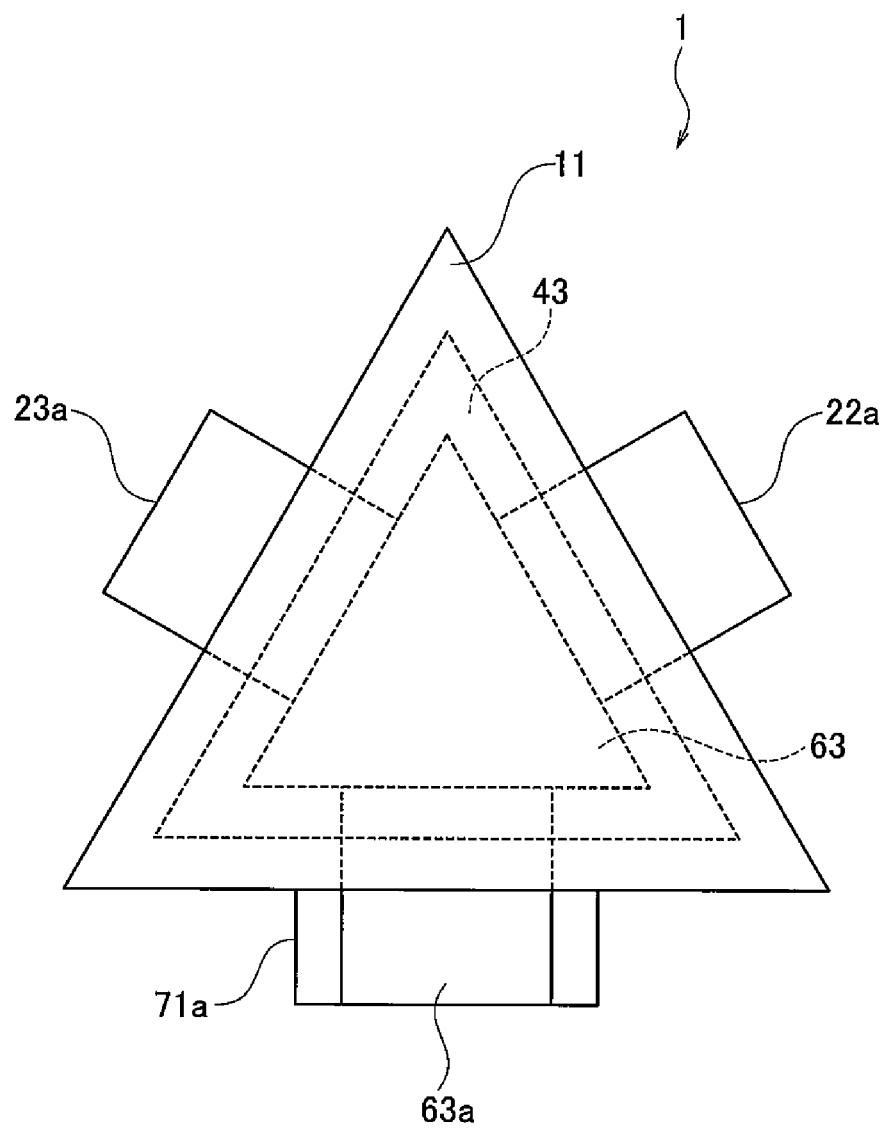
FIG. 1 is a diagram illustrating a plan view of an assembled battery according to a first embodiment of the present invention.

FIG. 1 is a diagram illustrating a plan view of an assembled battery according to a first embodiment of the present invention. An assembled battery 1 illustrated in FIG. 1 is formed by stacking three regular triangular flat batteries in the thickness direction and electrically connecting them in series.

The assembled battery 1 according to the present embodiment has a structure in which when all the flat batteries are stacked, positive-electrode terminals and negative-electrode terminals to be joined protrude from each side of the assembled battery 1, and in which by joining the positive-electrode terminals and negative-electrode terminals protruding from the respective sides, all the flat batteries are electrically connected in series.

Specifically, the flat battery has a planar shape of, for example, a regular triangle as illustrated in FIG. 1. The positive-electrode terminals and negative-electrode terminals are placed in positions rotated by 120° (360°/N), and each electrode terminal has a rectangular shape protruding from one side of the regular triangular flat battery.

FIG. 1, which is a plan view of the assembled battery 1, shows a positive-electrode terminal 22a of the second flat battery of the stacked three flat batteries, a positive-electrode terminal 23a of the third flat battery, a negative-electrode terminal 63a integrally formed with a negative-electrode current collector 63 of the third flat battery, a separator 43, and an exterior film 11 on one side. A positive-electrode terminal 21a of the first flat battery cannot be directly seen because it is positioned under the negative-electrode terminal 63a of the third flat battery. Note that FIG. 1 is a diagram for the case in which the exterior film 11 disposed at the top is opaque. Hence, the negative-electrode terminal 63a and the separator 43 that are stacked cannot be directly seen.

The negative-electrode current collector 63 provides a function of an electric conductor for collecting electricity and a function of a support. In this example, one side of the regular triangle has a part that has a width smaller than the length of the one side, extends outward, and serves as the negative-electrode terminal 63a.

The separator 43 is a member that separates the positive electrode and the negative electrode of the third flat battery and holds an electrolytic solution to provide ion conductivity between the electrodes. The shape of separators disposed between the first and the second flat batteries is the same as that of the separator 43 and the positive-electrode terminal 21a. Thus, only the uppermost separator 43 is seen in FIG. 1.

Note that separating films that separate the flat batteries from one another have the same shape as the exterior film 11 and a part of the positive-electrode terminal 21a, and hence, these separating films are not seen in FIG. 1. The details will be described later.

In the present embodiment, each flat battery that is stacked has a shape of a regular triangle, and the positive-electrode current collector, positive electrode, separator, negative electrode, negative-electrode current collector, exterior film, and separating film which constitute the flat battery also has a shape of a regular triangle.

As described above, the assembled battery according to the present embodiment is the assembled battery 1 in which multiple N-sided polygonal (N is an integer of 3 or more) flat batteries are stacked, and each of the N-sided polygonal flat batteries has a positive-electrode terminal and a negative-electrode terminal extending in different directions having an angle of 360°/N in between, and the flat batteries are electrically connected in series.

With this configuration, since, for example, a regular triangle is geometrically symmetric, the shape of the current collector integrated with the electrode terminal used in each flat battery can be the same even if the current collector is a member having a front surface and back surface subjected to different treatments. This makes the punching process for the member easy.

In addition, when the flat batteries are stacked, the positive-electrode terminal and the negative-electrode terminal of each flat battery are placed in positions rotated by 120° (360°/N). Therefore, all the flat batteries can be arranged so that they can be connected in series, by setting the positive-electrode terminal of the first flat battery as a base point and stacking each of the second and subsequent flat batteries with its positive-electrode terminal rotated by 120° each time.

In addition, the positive-electrode terminal of the first flat battery which is set as the base point and the negative-electrode terminal of the stacked third flat battery protrude from the same side of the assembled battery 1, and hence the positions of the positive-electrode terminal 21a and the negative-electrode terminal 63a which are connected to an external circuit are close, and this makes the wiring compact.

The electrode terminals other than the positive-electrode terminal 21a and the negative-electrode terminal 63a are joined by heat sealing, welding, or the like, so that all the flat batteries are connected in series. As described above, the assembled battery 1 according to the present embodiment is an assembled battery in which electrical joints of all the stacked flat batteries are made by connecting the electrode terminals protruding from each side of the regular triangle. Hence, the work is simple, and producing and procuring the members are easy because each flat battery is formed in the same shape.

In addition, since the electrode terminals of each flat battery protrude from different sides of the assembled battery 1, it is easy to monitor the voltage of each flat battery, thus the maintainability is also excellent.

(Manufacturing Method)

Figure 2:
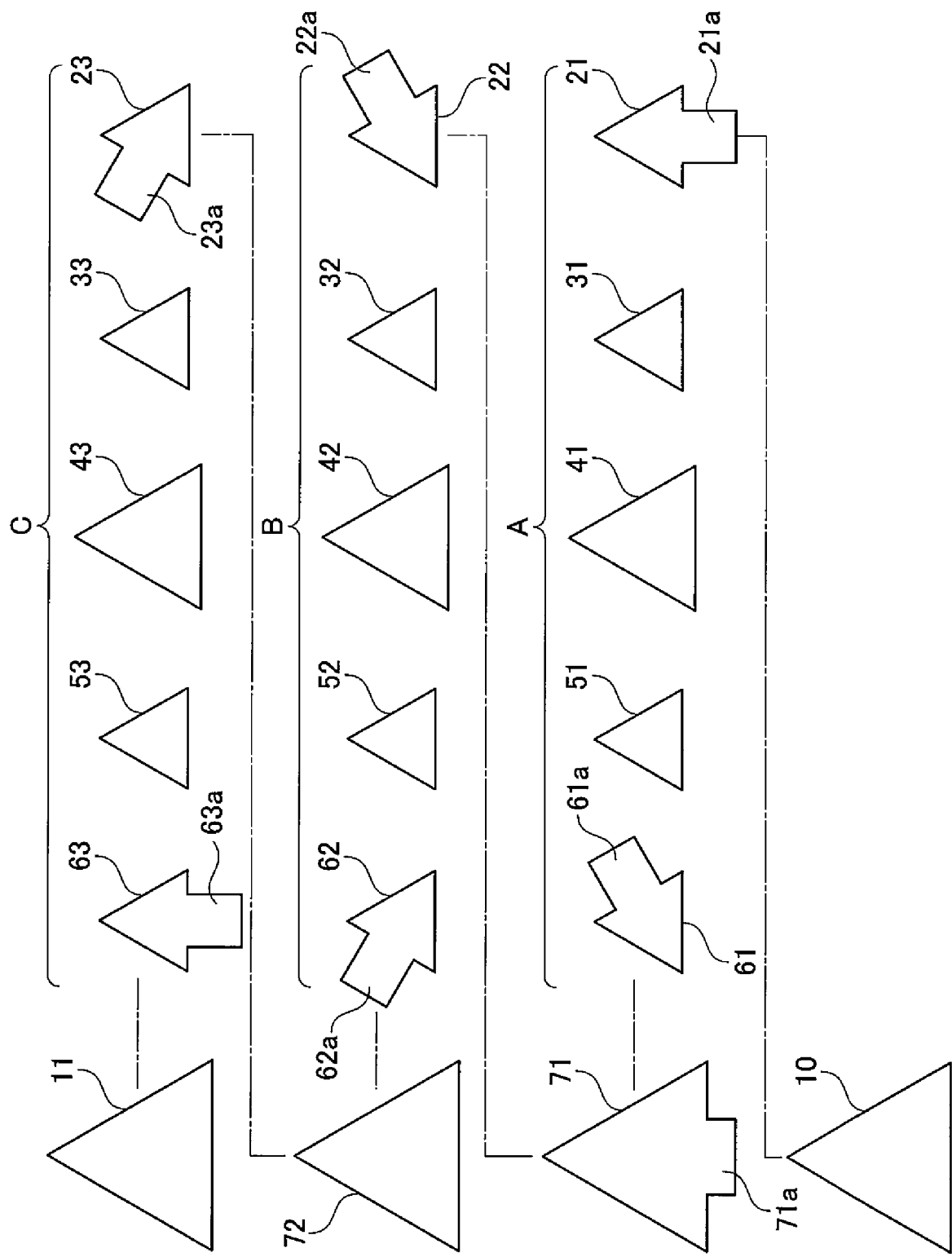
FIG. 2 is a diagram schematically illustrating a plan view of each of the multiple layers constituting the assembled battery illustrated in FIG. 1.

FIG. 2 is a diagram schematically illustrating the planar shape of each of the multiple layers constituting the assembled battery 1. With reference to FIG. 2, a manufacturing method of the assembled battery 1 will be described.

The assembled battery 1 is formed by connecting a flat battery A depicted at the first position from the bottom of FIG. 2, a flat battery B at the second position, and a flat battery C at the third position, in series. The assembled battery 1 of the stacked flat batteries A, B, and C are sealed with exterior films 10 and 11 from above and below in the thickness direction. The shape of the exterior films 10 and 11 in this example is a regular triangle larger than the planar shape of a positive electrode 31, a negative electrode 51, and the like.

The flat battery A is formed by stacking a positive-electrode current collector 21, the positive electrode 31, a separator 41, the negative electrode 51, and a negative-electrode current collector 61. One side of the positive-electrode current collector 21 in the shape of a regular triangle has a rectangular positive-electrode terminal 21a which has a width smaller than the length of the one side and extends outward from the one side, and the rectangular positive-electrode terminal 21a is formed integrally with the positive-electrode current collector 21. Also, one side of the negative-electrode current collector 61 in the shape of a regular triangle has a rectangular negative-electrode terminal 61a which has a width smaller than the length of the one side and extends outward from the one side, and the negative-electrode terminal 61a is formed integrally with the negative-electrode current collector 61. The negative-electrode terminal 61a is at 120° from the positive-electrode terminal 21a.

As with the flat battery A, the flat batteries B and C each are formed by stacking a positive-electrode current collector 22 or 23, a positive electrode 32 or 33, a separator 42 or 43, a negative electrode 52 or 53, and a negative-electrode current collector 62 or 63. The positive-electrode terminals 22a and 23a and the negative-electrode terminals 62a and 63a of the flat batteries B and C are formed in the same manner as for the flat battery A. The negative-electrode terminal 63a of the flat battery C is placed at the same position as the plane position of the positive-electrode terminal 21a. The negative-electrode terminal 63a and the positive-electrode terminal 21a are separate in the thickness direction.

Between the flat battery A and the flat battery B is disposed a separating film 71. Between the flat battery B and the flat battery C is disposed a separating film 72. The planar shapes of the separating films 71 and 72 need to be larger than or equal to the planar shapes of the separators 41, 42, and 43. This is because if the sizes of the separating films 71 and 71 are smaller than the sizes of the separators 41, 42, and 43, the electrolytic solution leaks and causes a liquid junction between the flat batteries A, B, and C.

The planar shapes of the separating films 71 and 72 may be any shape that can cover the separators 41, 42, and 43. In this example, the shapes of the separating films 71 and 72 are constituted of the same regular triangle as those of the exterior films 10 and 11.

Note that a side of the separating film 71 corresponding to the positive-electrode terminal 21a has a rectangular insulating portion 71a that has a width larger than the width of the positive-electrode terminal 21a and extends outward, and the insulating portion 71a is formed integrally with the separating film 71.

This insulating portion 71a functions to prevent an electrical short circuit between the positive-electrode terminal 21a and the negative-electrode terminal 63a placed at the same position as the plane position of the positive-electrode terminal 21a. This enables the positive-electrode terminal 21a and the negative-electrode terminal 63a to be wired by pressing connection such that they are sandwiched by a clip, a bolt and nut, washers, or the like. This makes connection to an external circuit easier.

Next, the material of each layer will be described. As illustrated in FIG. 2, the assembled battery 1 according to the present embodiment includes the positive-electrode current collectors 21, 22, and 23, the positive electrodes 31, 32, and 33, the separators 41, 42, and 43, the negative electrodes 51, 52, and 53, the negative-electrode current collectors 61, 62, and 63, the separating films 71 and 72, and the exterior films 10 and 11.

For example, the positive-electrode current collectors 21, 22, and 23 are formed of a carbon cloth, the positive electrodes 31, 32, and 33 a carbon porous material, the separators 41, 42, and 43 a plant-derived microporous membrane, the negative electrodes 51, 52, and 53 magnesium, the negative-electrode current collectors 61, 62, and 63 a carbon cloth, the separating films 71 and 72 a biodegradable film, and the exterior films 10 and 11 a biodegradable film.

The assembled battery 1 in this example is a magnesium-air battery with a low environment impact that does not contain a rare metal or hazardous substances. Note that the assembled battery 1 is not limited to a magnesium-air battery but may be any low-environment-impact battery, such as an air battery, a fuel-cell battery, a biofuel-cell battery, and an ion battery.

Further, the configuration of the present embodiment can be applied to various batteries other than low-environment-impact batteries. Although the separators 41, 42, and 43 in the present embodiment hold an aqueous solution of sodium chloride as the electrolytic solution, it may be another electrolytic solution that can be used for a battery.

A solid electrolyte may be used. In the case of using a solid electrolyte, there is no need for the separating films 71 and 72 because the problem of a liquid junction does not occur. In addition, only one of the positive-electrode current collector 22 and the negative-electrode current collector 61 and only one of the positive-electrode current collector 23 and the negative-electrode current collector 62 is necessary. In this case, the positive-electrode current collector 21 and the negative-electrode current collector 63 are necessary.

As a further alternative, in the case of using an electrolytic solution, the electrolytic solution may be hold outside, and the power generation may be configured to start when a tip end of the assembled battery 1 is cut with scissors, a cutter, or the like, and is impregnated with an electrolytic solution. Such a configuration prevents the occurrence of problems such as a shortage of the electrolytic solution due to the volatilization, corrosion of the positive electrodes 31, 32, and 33 and the negative electrodes 51, 52, and 53, and self-discharging.

Further, instead of using the approach of impregnation of an electrolytic solution, the separators 41, 42, and 43 or the flat batteries A, B, and C may contain an electrolyte in advance, so that when water is impregnated into them, the assembled battery 1 can start working as a battery.

(Assembling)

Figure 3:
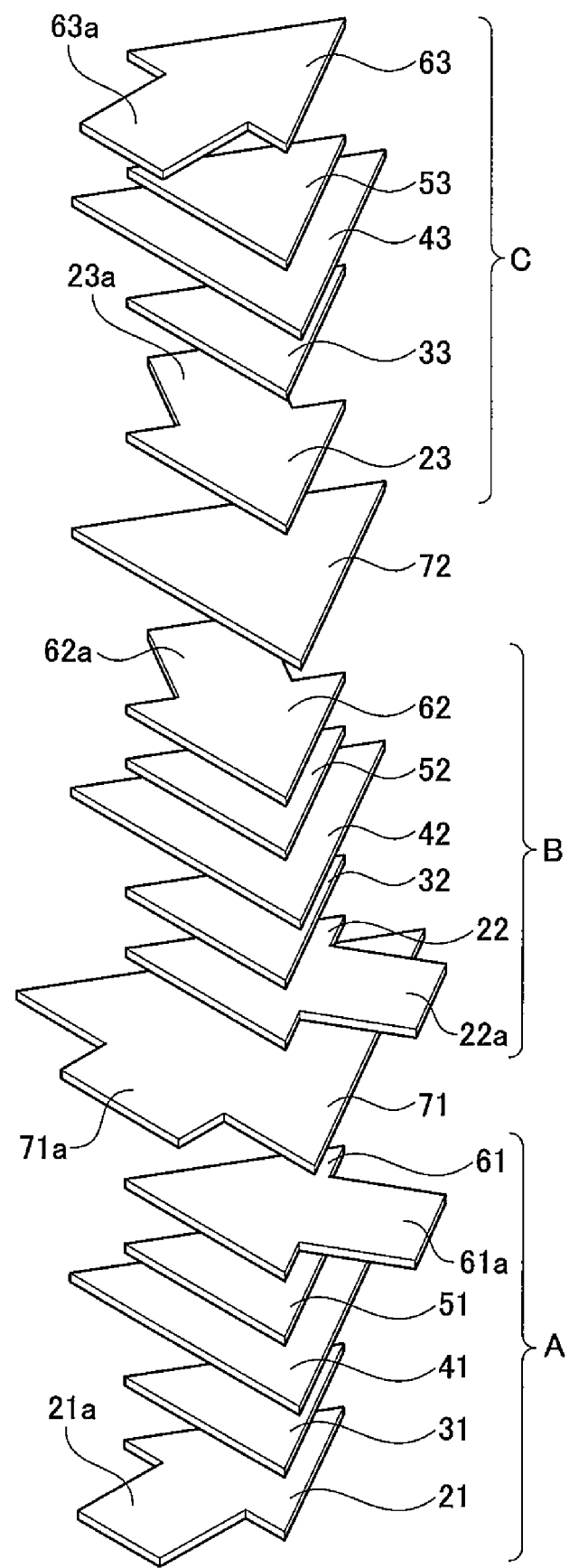
FIG. 3 is a diagram schematically illustrating a method of assembling the assembled battery illustrated in FIG. 1.

FIG. 3 is a diagram schematically illustrating a method of assembling the assembled battery 1. With reference to FIG. 3, a method of assembling the assembled battery 1 will be described.

As illustrated in FIG. 3, assuming that the positive-electrode current collector 21 is placed at the bottom such that the positive-electrode terminal 21a is oriented in the direction of 6 o'clock, the positive electrode 31, the separator 41, the negative electrode 51 are placed in this order on top of the positive-electrode current collector 21, and then the negative-electrode current collector 61 is placed such that the negative-electrode terminal 61a is oriented in the direction 120° counterclockwise from the direction of the positive-electrode current collector 21 (in the direction of 2 o'clock).

Next, before the second flat battery B is stacked on top of the flat battery A, the separating film 71 is necessary between the flat battery A and the flat battery B for preventing an electrical short circuit and a liquid junction of the electrolytic solution.

After the separating film 71 is stacked on the flat battery A, the positive-electrode current collector 22 is placed such that the positive-electrode terminal 22a is oriented in the same direction (in the direction of 2 o'clock) as the negative-electrode terminal 61a of the flat battery A. On top of it, the positive electrode 32, the separator 42, and the negative electrode 52 are placed in this order, as with the flat battery A. Then, the negative-electrode current collector 62 is placed such that the negative-electrode terminal 62a is oriented in the direction at 120° counterclockwise from the direction of the positive-electrode terminal 22a of the flat battery B (in the direction of 10 o'clock).

Next, before the flat battery C to be positioned at the top is stacked on the flat battery B, the separating film 72 is necessary between the flat battery B and the flat battery C in the same manner as for between the flat battery A and the flat battery B.

After the separating film 72 is stacked on the flat battery B, the positive-electrode current collector 23 is placed such that the positive-electrode terminal 23a is oriented in the same direction (in the direction of 10 o'clock) as the negative-electrode terminal 62 of the flat battery B. On top of it, the positive electrode 33, the separator 43, and the negative electrode 53 are placed in this order, as with the flat batteries A and B. Then, the negative-electrode current collector 63 is placed such that the negative-electrode terminal 63a is oriented in the direction at 120° counterclockwise from the direction of the positive-electrode terminal 23a of the flat battery C (in the direction of 6 o'clock).

Although the description of the above example is made assuming the positive-electrode terminal 21a of the flat battery A positioned at the bottom is oriented in the direction of 6 o'clock, the present embodiment should not be limited to the arrangement directions and rotation directions of the electrode terminals illustrated in FIG. 3.

Further, to pack each of the flat batteries A, B, and C, the flat batteries A, B, and C are sandwiched between the exterior films 10 and 11, and the exterior films 10 and 11 and the separating films 71 and 72 are heat-sealed with a heat sealer or the like.

Lastly, to electrically connect the stacked flat batteries A, B, and C in series, the negative-electrode terminal 61a and the positive-electrode terminal 22a oriented in the direction of 2 o'clock and the negative-electrode terminal 62a and the positive-electrode terminal 23a oriented in the direction of 10 o'clock are heat-sealed with a heat sealer or the like, and this completes the assembled battery 1. Hereinafter, the junction of the negative-electrode terminal 61a and the positive-electrode terminal 22a is referred to as the junction AB. The junction of the negative-electrode terminal 62a and the positive-electrode terminal 23a is referred to as junction BC.

To measure the battery voltage of each of the flat batteries A, B, and C, a measuring instrument such as a voltage meter is connected to the electrode terminals corresponding to each of the flat batteries A, B, and C. To measure the battery voltage of the flat battery A, the voltage between the positive-electrode terminal 21a and the junction AB is measured, to measure the battery voltage of the flat battery B, the voltage between the junction AB and the junction BC is measured, and to measure the battery voltage of the flat battery C, the voltage between the junction BC and the negative-electrode terminal 63a is measured.

As has been described above, the method of manufacturing an assembled battery according to the present embodiment makes it possible to manufacture the assembled battery 1 in which three flat batteries are connected in series. Since the electrical joints of the flat batteries A, B, and C can be achieved by connecting the electrode terminals protruding from each side of the regular triangle, the assembled battery can be constituted of only the necessary materials, and this makes the workability favorable. In addition, since each of the flat batteries A, B, and C are constituted of members in the same shapes, producing and manufacturing of the members are easy.

Further, when the electrode terminals are joined, the stacked flat batteries A, B, and C are not subjected to stress. Thus, the junctions AB and BC are not easily peeled off, and this makes the durability and reliability excellent. In addition, since the voltage of each of the flat batteries A, B, and C can be monitored from the electrode terminals, the maintainability is also excellent.

Second Embodiment

Figure 4:
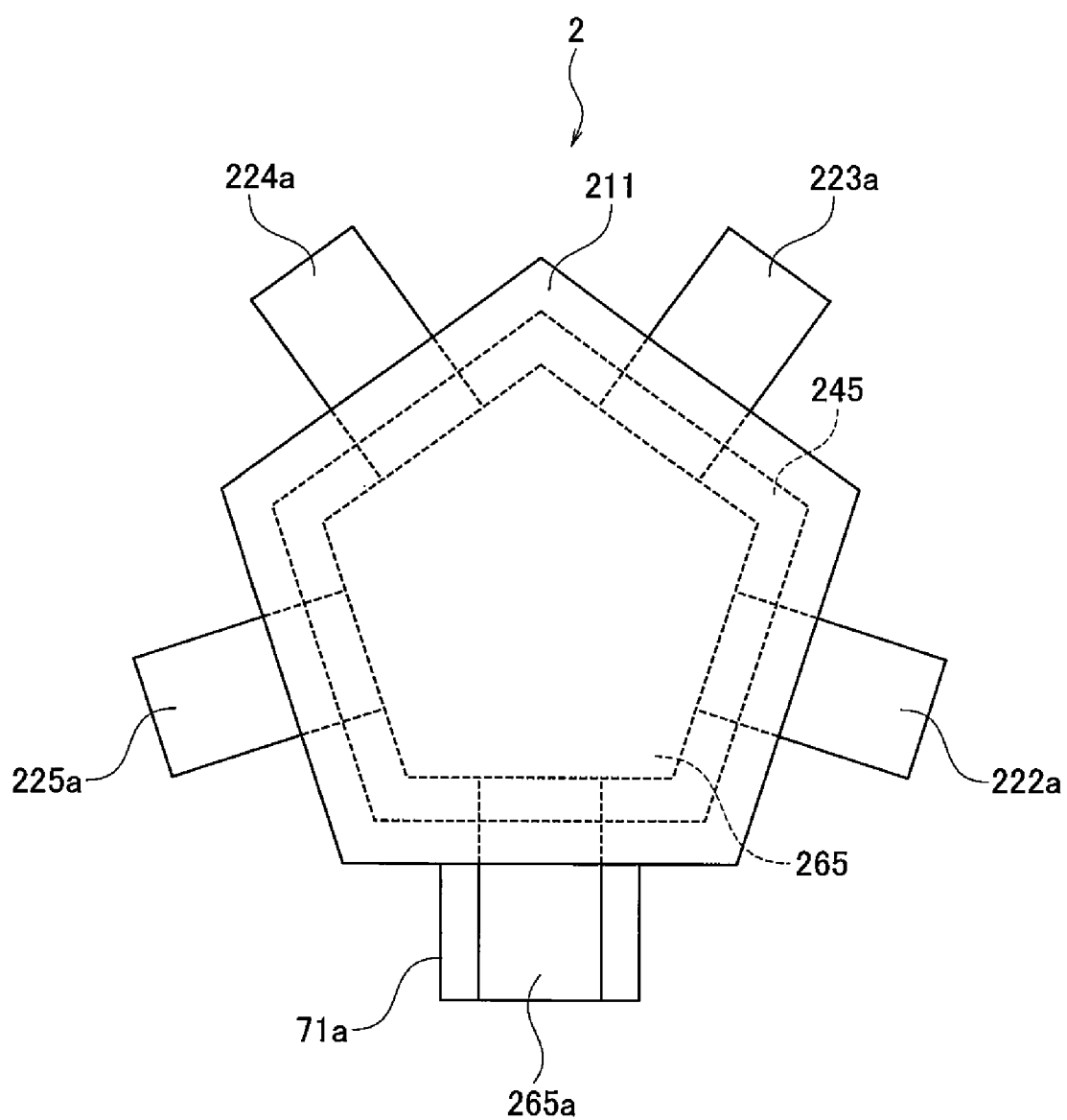
FIG. 4 is a diagram illustrating a plan view of an assembled battery according to a second embodiment of the present invention.

FIG. 4 is a diagram illustrating a plan view of an assembled battery according to a second embodiment of the present invention. An assembled battery 1 illustrated in FIG. 4 is formed by stacking five regular pentagonal flat batteries in the thickness direction and electrically connecting them in series.

Each of the five flat batteries has a planar shape of, for example, a regular pentagon. The positive-electrode terminals and negative-electrode terminals are placed in positions rotated by 72° (360°/N), and each electrode terminal has a rectangular shape protruding from one side of the regular pentagonal flat battery.

FIG. 4, which is a plan view of the assembled battery 2, shows a positive-electrode terminal 222a of the second flat battery of the stacked five flat batteries, a positive-electrode terminal 223a of the third flat battery, a positive-electrode terminal 224a of the fourth flat battery, a positive-electrode terminal 225a of the fifth flat battery, a negative-electrode terminal 265a formed integrally with a negative-electrode current collector 265 of the fifth flat battery, a separator 245, and an exterior film 211 on one side. A positive-electrode terminal 221a of the first flat battery cannot be directly seen because it is positioned under the negative-electrode terminal 265a of the fifth flat battery.

Figure 5:
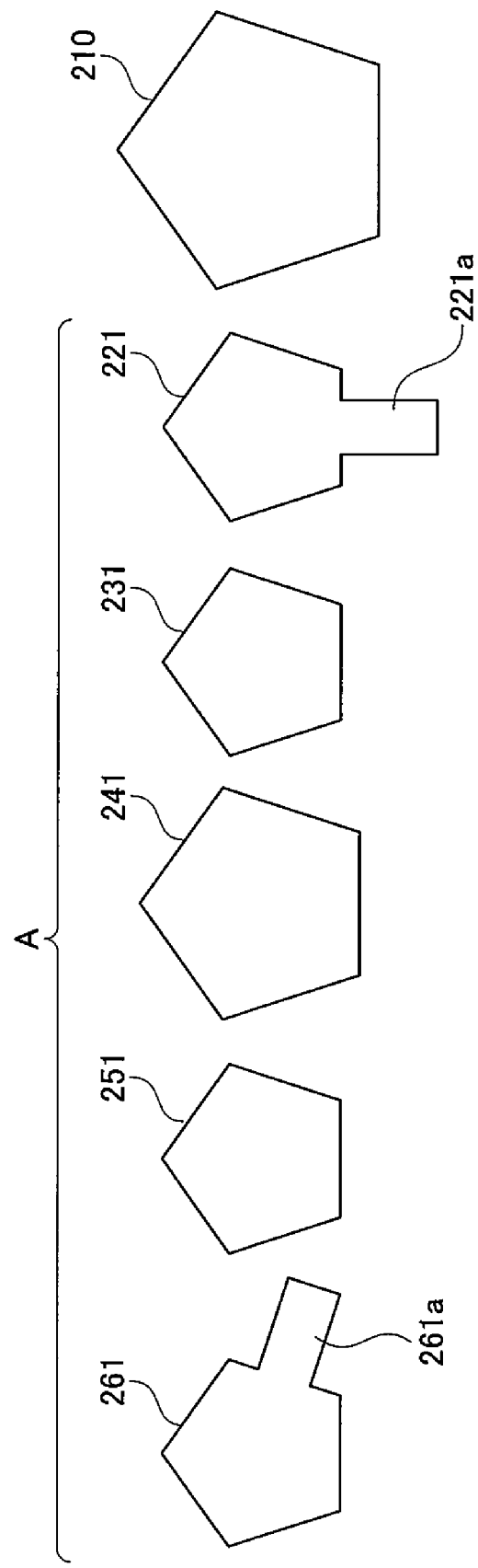
FIG. 5 is a diagram illustrating a plan view of each layer of the first flat battery included in the assembled battery illustrated in FIG. 4.

FIG. 5 is a diagram schematically illustrating the planar shape of each of the multiple layers constituting the assembled battery 2. FIG. 5 illustrates a plan view of each of the layers constituting a flat battery A, which is the first one from the bottom, of five flat batteries A, B, C, D, and E constituting the assembled battery 2. Each of the second and subsequent flat batteries B to E is constituted of layers having the same shapes as those of the flat battery A, in the same manner as in the assembled battery 1, and thus illustration thereof is omitted.

The first flat battery A of the assembled battery 2 is formed by stacking a positive-electrode current collector 221, a positive electrode 231, a separator 241, a negative electrode 251, and a negative-electrode current collector 261. One side of the positive-electrode current collector 221 in the shape of a regular pentagon has a rectangular positive-electrode terminal 221a that has a width smaller than the length of the one side and extends outward from the one side, and the rectangular positive-electrode terminal 221a is formed integrally with the positive-electrode current collector 221. Also, one side of the negative-electrode current collector 261 in the shape of a regular pentagon has a rectangular negative-electrode terminal 261a that has a width smaller than the length of the one side and extends outward from the one side, and the rectangular negative-electrode terminal 261a is formed integrally with the negative-electrode current collector 261. The negative-electrode terminal 61a is rotated by 72° from the positive-electrode terminal 21a.

The second and subsequent flat batteries B to E are configured in the same manner as in the assembled battery 1 in the shape of a regular triangle except only that the shapes of the positive electrode 231, the negative electrode 251, and other parts are regular pentagons and that the angle between the extending electrode terminals is 72°.

The assembled battery 2 according to the present embodiment has five flat batteries connected in series. The assembled battery 2 is different from the assembled battery 1 in that, assuming that the terminal voltage of one flat battery of the assembled battery 2 is the same as in the assembled battery 1, the assembled battery 2 is capable of generating a higher voltage than the assembled battery 1. The advantageous effect that the assembled battery 2 provides is the same as that of the assembled battery 1. Hence, further description is omitted.

Third Embodiment

Figure 6:
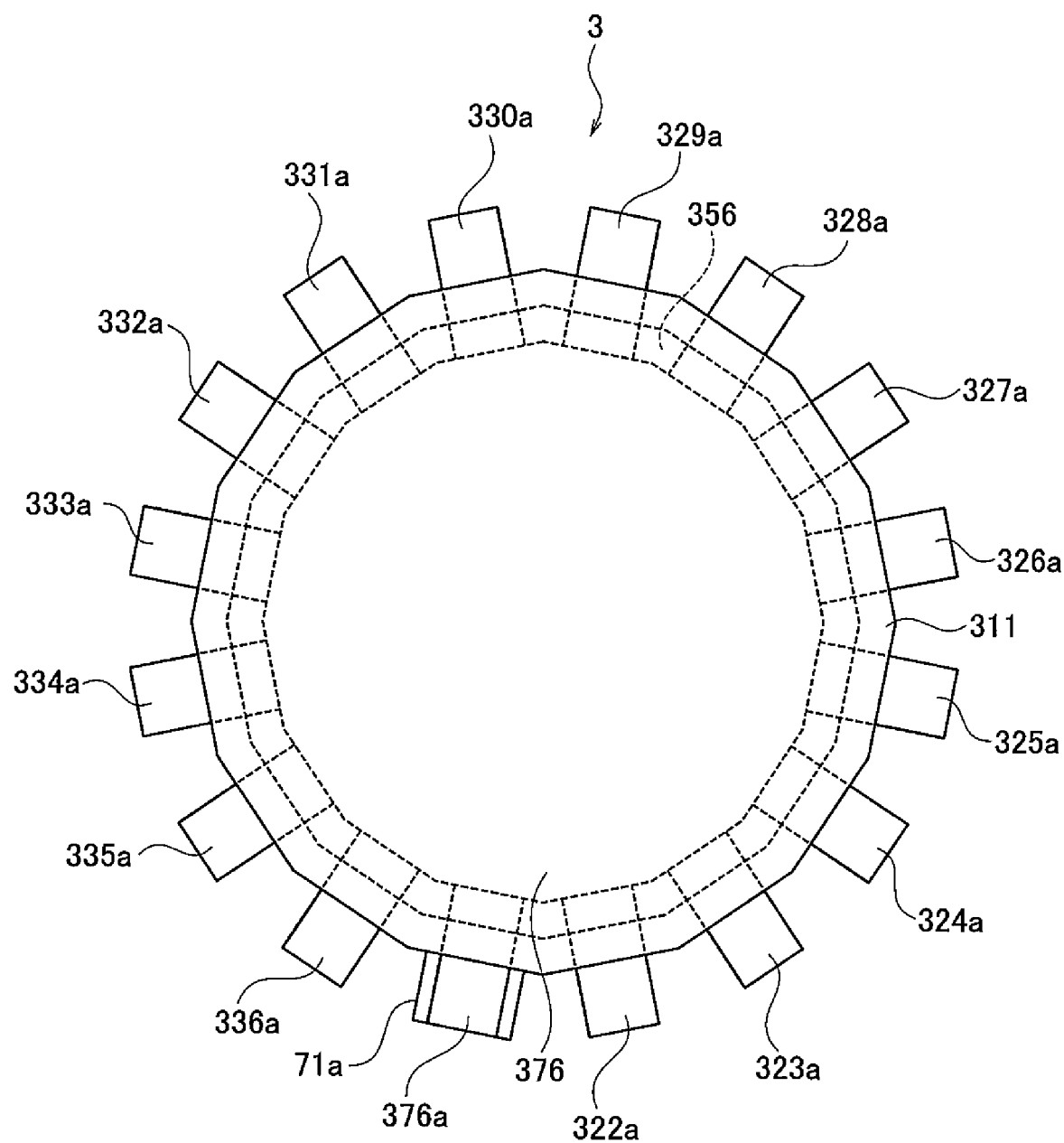
FIG. 6 is a diagram illustrating a plan view of an assembled battery according to a third embodiment of the present invention.

FIG. 6 is a diagram illustrating a plan view of an assembled battery according to a third embodiment of the present invention. An assembled battery 1 illustrated in FIG. 6 is formed by stacking 16 regular hexadecagonal flat batteries in the thickness direction and electrically connecting them in series.

Each of the sixteen flat batteries has a planar shape of, for example, a regular hexadecagon. The positive-electrode terminals and negative-electrode terminals are placed in positions rotated by 20° (360°/N), and each electro terminal has a rectangular shape protruding from one side of the regular hexadecagon flat battery.

FIG. 6, which is a plan view of the assembled battery 3, shows a positive-electrode terminal 322a of the second flat battery of the stacked sixteen flat batteries to a positive-electrode terminal 336a of the sixteenth flat battery, a negative-electrode terminal 376a formed integrally with a negative-electrode current collector 376 of the sixteenth flat battery, a separator 356, and an exterior film 311 on one side. A positive-electrode terminal 321a of the first flat battery cannot be directly seen because it is positioned under the negative-electrode terminal 376a of the sixteenth flat battery.

Figure 7:
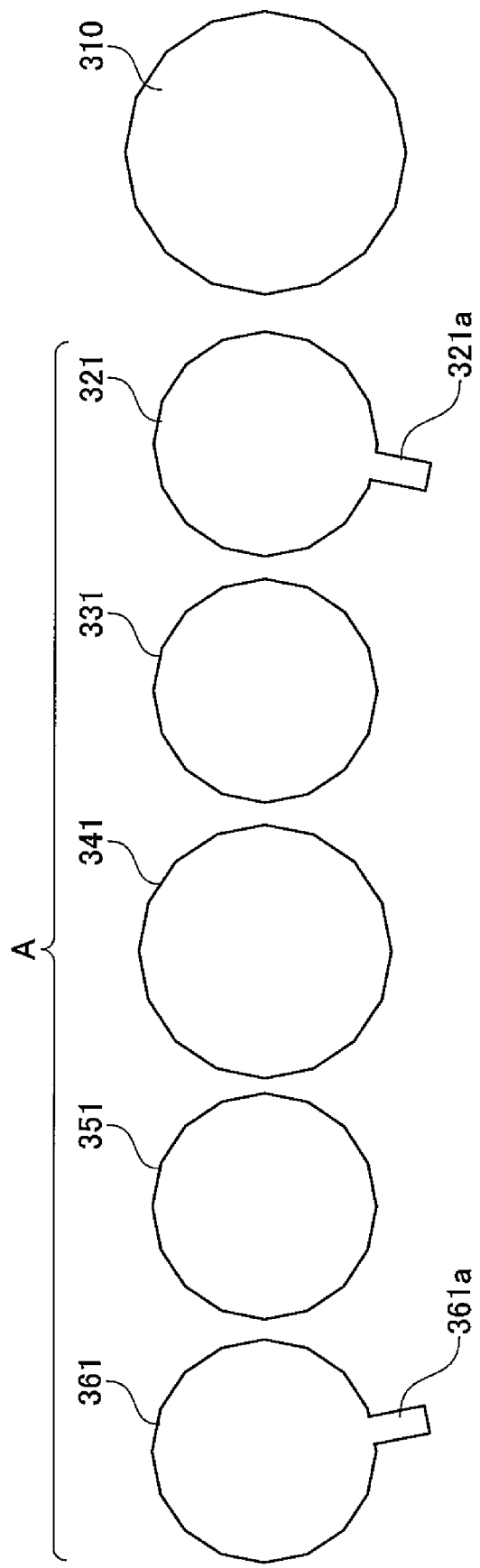
FIG. 7 is a diagram illustrating a plan view of each layer of the first flat battery included in the assembled battery illustrated in FIG. 6.

FIG. 7 illustrates a plan view of each of the layers constituting a flat battery A, which is the first one from the bottom, of sixteen flat batteries A to P constituting the assembled battery 3. Each of the second and subsequent flat batteries B to P is constituted of layers having the same shapes as those of the flat battery A, in the same manner as in the assembled battery 1 or 2, and thus illustration thereof is omitted.

The first flat battery A of the assembled battery 3 is formed by stacking a positive-electrode current collector 321, a positive electrode 331, a separator 341, a negative electrode 351, and a negative-electrode current collector 361. One side of the positive-electrode current collector 321 in the shape of a regular hexadecagon has a rectangular positive-electrode terminal 321a that has a width smaller than the length of the one side and extends outward from the one side, and the rectangular positive-electrode terminal 321a is formed integrally with the positive-electrode current collector 321. Also, one side of the negative-electrode current collector 361 in the shape of a regular hexadecagon has a rectangular negative-electrode terminal 361a that has a width smaller than the length of the one side and extends outward from the one side, and the rectangular negative-electrode terminal 361a is formed integrally with the negative-electrode current collector 361. The negative-electrode terminal 361a is rotated by 20° from the positive-electrode terminal 321a.

The second and subsequent flat batteries B to P are configured in the same manner as in the assembled battery 1 or 2 in the shape of a regular triangle or a regular pentagon except only that the shapes of the positive electrode 331, the negative electrode 351, and other parts are regular hexadecagons and that the angle between the extending electrode terminals is 20°. The advantageous effect that the assembled battery 3 provides is also the same as those of the assembled batteries 1 and 2.

The assembled battery 3 according to the present embodiment has sixteen flat batteries connected in series. The assembled battery 3 is different from the assembled battery 1 in that, assuming that the terminal voltage of one flat battery of the assembled battery 3 is the same as in the assembled battery 1, the assembled battery 3 is capable of generating a higher voltage than the assembled battery 1.

As has been described above, the assembled battery according to the present embodiments is an assembled battery including stacked multiple flat batteries each having an N-sided polygon (N is an integer of 3 or more), in which the N-sided polygonal multiple flat batteries each have a positive-electrode terminal and a negative-electrode terminal extending in different directions having an angle of 360°/N in between, and the N-sided polygonal multiple flat batteries are electrically connected in series. This configuration makes it possible to provide an assembled battery in which a large number of flat batteries can be stacked easily.

Although description of the third embodiment has been made for an example in which sixteen flat batteries are connected in series, the present invention is not limited to this example. The number of flat batteries may be smaller than or larger than 16. The number of flat batteries may be any number equal to or larger than 3.

Although description of the above embodiments has been made for examples of a regular triangle, a regular pentagon, and a regular hexadecagon, the present invention is not limited to these examples. The technical ideas of the present invention can be applied to N-sided polygons in which N is an integer of 3 or more.

In addition, the technical ideas of the present invention can be applied even in a case where the shape of the flat battery is not a polygon. The present invention can be implemented in cases where the flat battery is circular or where the shape of the flat battery is somehow symmetrical when it is rotated on its center.

In other words, an assembled battery may have a configuration in which M flat batteries (M is an integer of 3 or more) each having the same planar shape are stacked, each flat battery has a positive-electrode terminal and a negative-electrode terminal extending in different directions having an angle of 360°/M in between with respect to the center of the flat battery, and the flat batteries are electrically connected in series. Hence, the present invention is not limited to the above embodiments but may be modified within the range of the spirit thereof.

For example, in modifications described below, the separating films 71 and 72 and the exterior film 11 in the above embodiments may have a hole or holes through which air, an electrolytic solution, a solvent or the like are put in.
Modification 1

Figure 8:
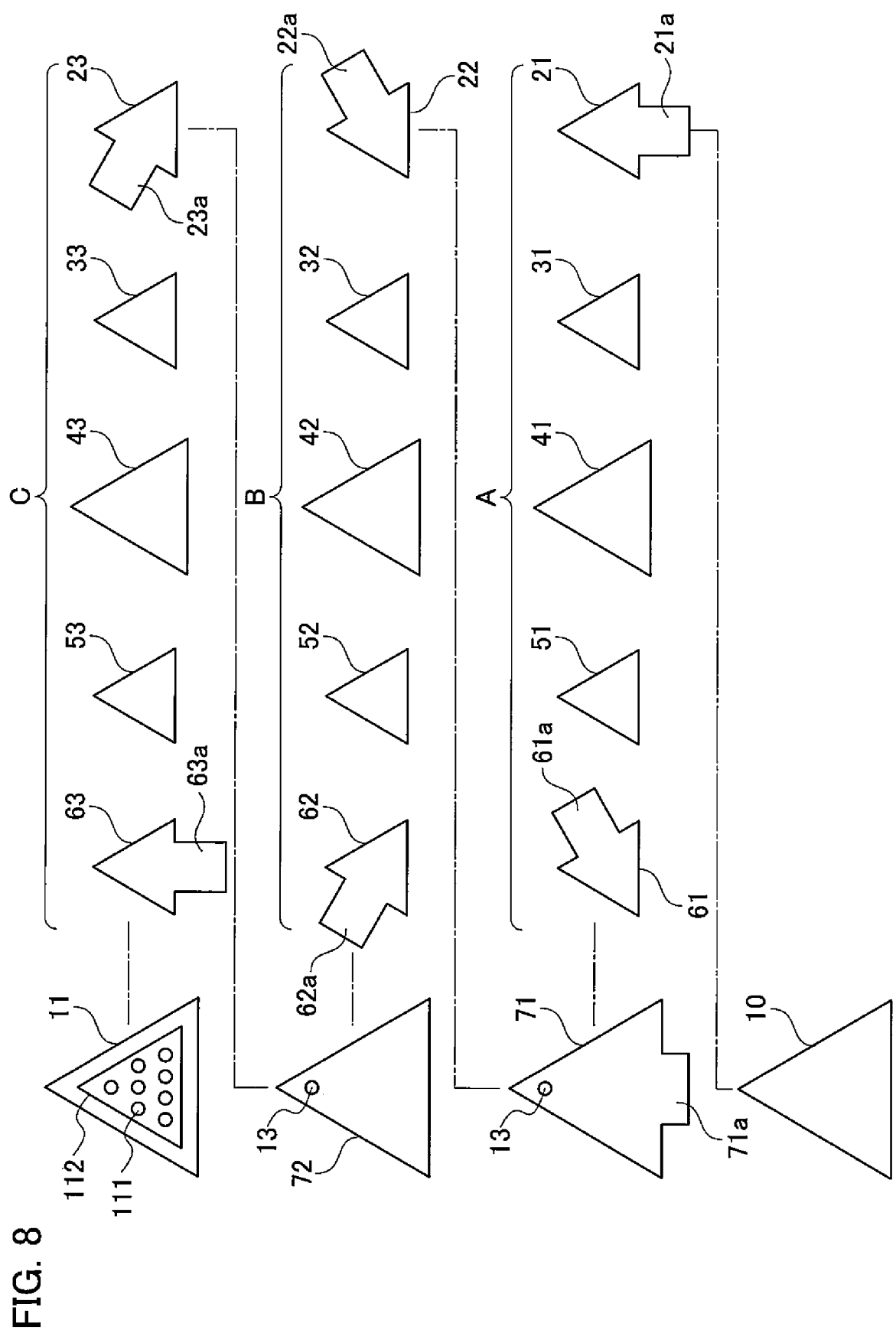
FIG. 8 is a diagram illustrating an example of a hole of separating films in modification 1.

FIG. 8 is a diagram illustrating an example of holes of the separating films 71 and 72 in modification 1. The assembled battery in the present modification is an air battery. An air battery uses oxygen in air as a positive-electrode active material and metal as a negative-electrode active material. The separating films of the present modification have at least one hole 13 (air hole) through which air flows in. Although the separating films in the illustrated example have one hole 13, the separating films may have multiple holes 13. In addition, the position of the hole 13 is desired to be outside the separators 41, 42, and 43 to prevent a liquid junction of the electrolytic solution between the flat batteries.

The exterior film 11 of the present modification has one or multiple holes 111 (air holes), and a sealing seal 112 for closing the holes 111 is attached to the exterior film 11. Alternatively, both the two exterior films 11 and 10 may have holes and sealing seals. In the present modification, when the user uses the assembled battery, the user peels the sealing seal 112 off the exterior film 11. Air flows into the assembled battery through the holes 111 of the exterior film 11 and the holes 13 of the separating films 71 and 72, and the assembled battery starts power generation or electrical discharge. This configuration prevents the occurrence of problems that would occur before the user uses the assembled battery such as corrosion of positive and negative electrodes and self-discharging.

The holes 13 and 111 may be formed in advance in the separating films 71 and 72 and the exterior film 11 as illustrated in FIG. 8. Alternatively, the assembled battery may have a configuration in which when the user uses the assembled battery, the user cuts a tip end of the assembled battery with scissors, a cutter, or the like to make the holes 13 and 111.

Figure 9:
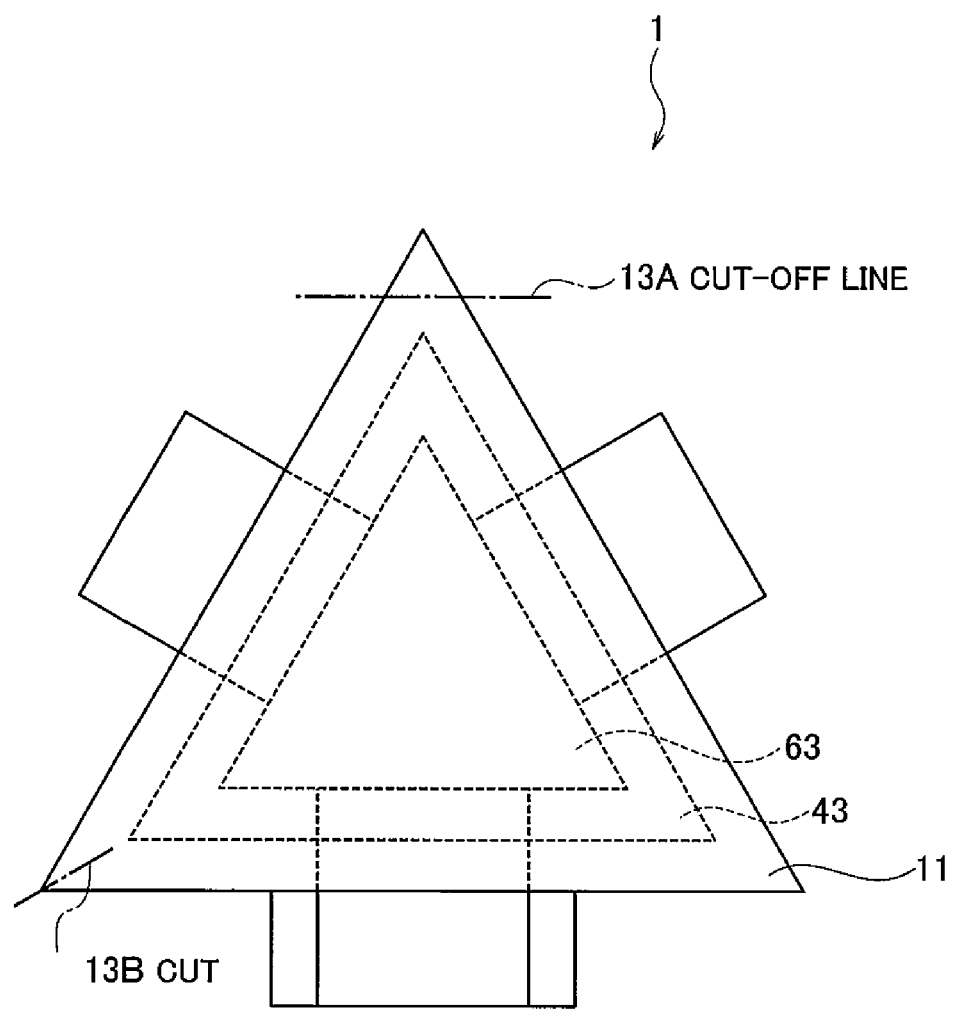
FIG. 9 is an explanatory diagram for explaining cutting positions of a triangular assembled battery in modification 1.

FIG. 9 is an explanatory diagram for explaining cutting positions for the case in which the user makes the holes 13 and 111 in the triangular assembled battery illustrated in FIG. 1. Here, description will be made for the case of making holes by cutting off a tip end of the assembled battery along a cut-off line 13A and for the case of making holes by making a cut in the assembled battery 1 along a cut line 13B. To prevent a liquid junction of the electrolytic solution between the flat batteries, it is desirable that the cut-off line 13A be outside the separators 41, 42, and 43, in other words, at a position that does not allow the separators to be cut (higher than the top of the separator 43 in the figure). With this configuration, holes are made in the separating films 71 and 72 and the exterior films 10 and 11. Alternatively, holes may be made in the separating films 71 and 72 and the exterior films 10 and 11 by making a cut in a tip end of the assembled battery along the cut line 13B. The cut line 13B is also desired to be outside the separators 41, 42, and 43, in other words, at a position that does not allow the separators to be cut.

Figure 10:
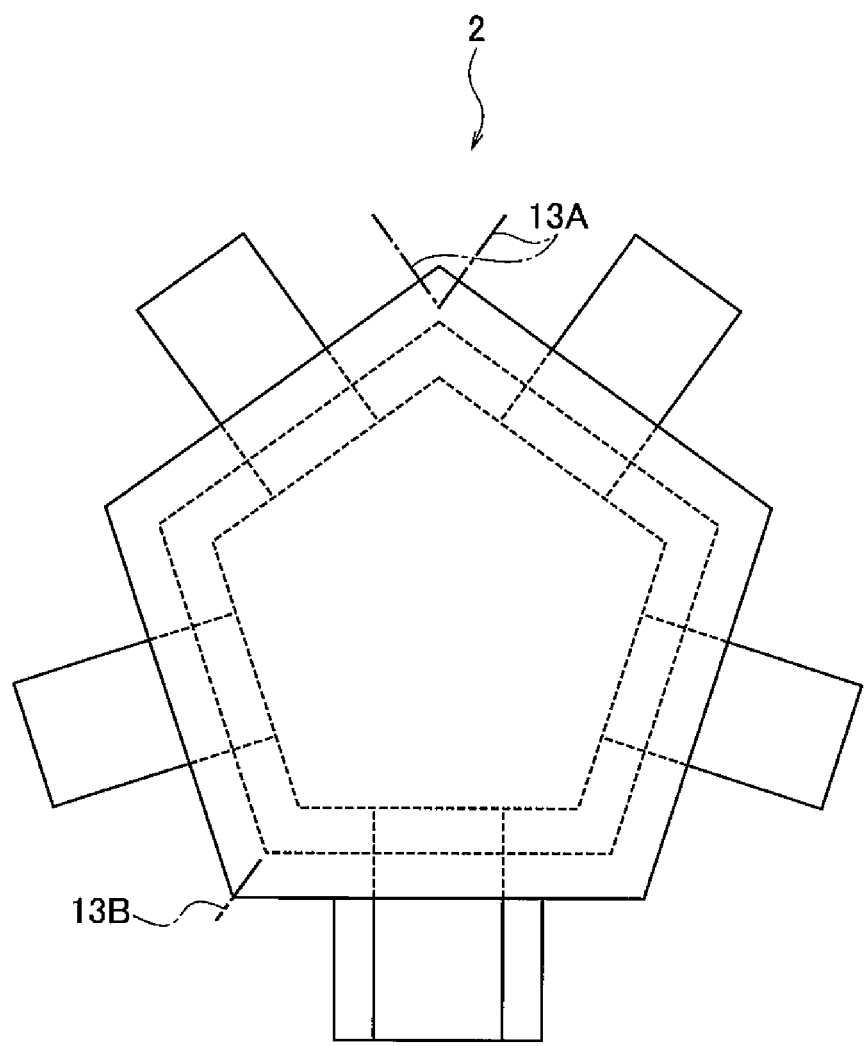
FIG. 10 is an explanatory diagram for explaining cutting positions of a pentagonal assembled battery in modification 1.
Figure 11:
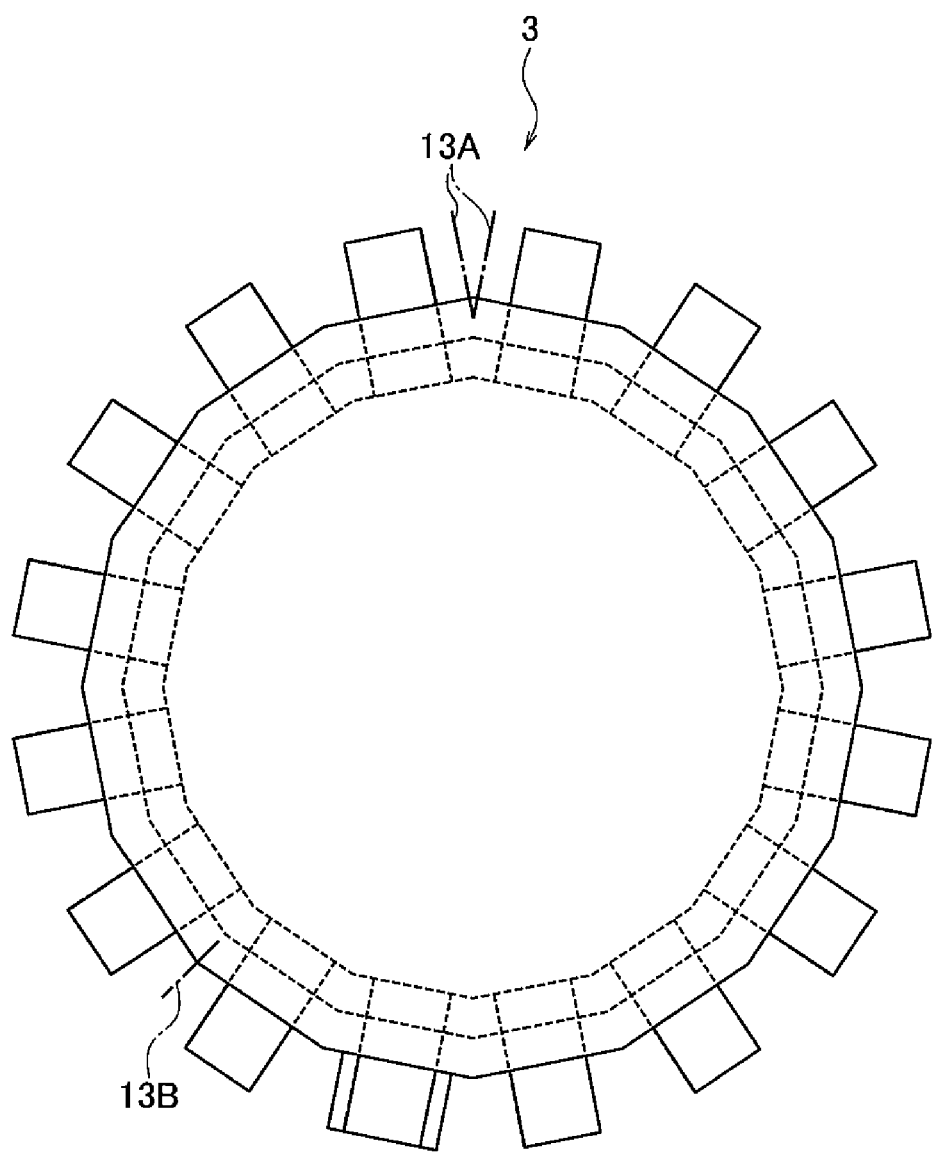
FIG. 11 is an explanatory diagram for explaining cutting positions of a hexadecagonal assembled battery in modification 1.

FIG. 10 is a diagram illustrating an example of a cut-off line 13A and a cut line 13B for the pentagonal assembled battery illustrated in FIG. 4. FIG. 11 is a diagram illustrating an example of a cut-off line 13A and a cut line 13B for the hexadecagonal assembled battery illustrated in FIG. 6.
Modification 2

Figure 12:
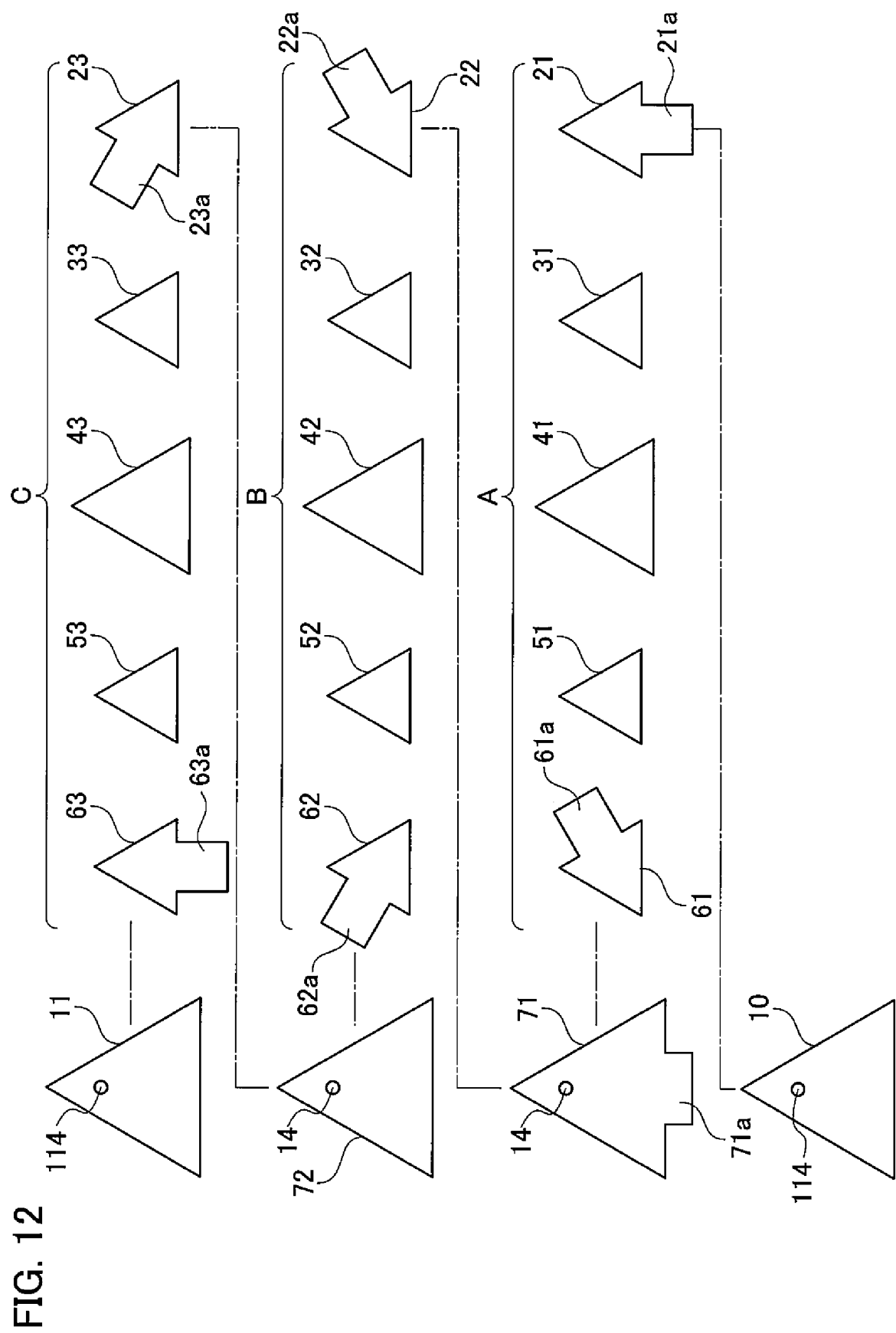
FIG. 12 is a diagram illustrating an example of a hole of separating films in modification 2.

FIG. 12 is a diagram illustrating an example of holes of the separating films 71 and 72 and the exterior films 10 and 11 in modification 2. The assembled battery according to the present modification does not have an electrolytic solution inside the assembled battery. The separating films 71 and 72 according to the present modification have at least one hole 14 (liquid hole) through which an electrolytic solution is put in. The exterior films 10 and 11 also have at least one hole 114 (liquid hole) through which the electrolytic solution is put in. For the hole 114, only one of the exterior films 10 and 11 may have one. Although each film in the illustrated example has one hole 14 or 114, each film may have multiple holes. In addition, to put an electrolytic solution into the assembled battery, it is desirable that the position of the hole 14 be inside the separators 41, 42, and 43 but outside the positive electrodes, the negative electrodes, the positive-electrode current collectors, and the negative-electrode current collectors.

In the present modification, when the user uses the assembled battery, the user puts an electrolytic solution through the holes 14 and 114 and impregnate it into the assembled battery. The electrolytic solution flows into the assembled battery through the holes 14 and 114, and the assembled battery starts power generation or electrical discharge. This configuration prevents the occurrence of problems that would occur before the user uses the assembled battery such as a shortage of the electrolytic solution due to the volatilization, corrosion of positive and negative electrodes, and self-discharging. The holes 14 and 114 may be formed in advance in the separating films 71 and 72 and the exterior film 11 as illustrated in FIG. 12. Alternatively, the assembled battery may have a configuration in which when the user uses the assembled battery, the user cuts a tip end of the assembled battery with scissors, a cutter, or the like to make the holes 14 and 114.

Figure 13:
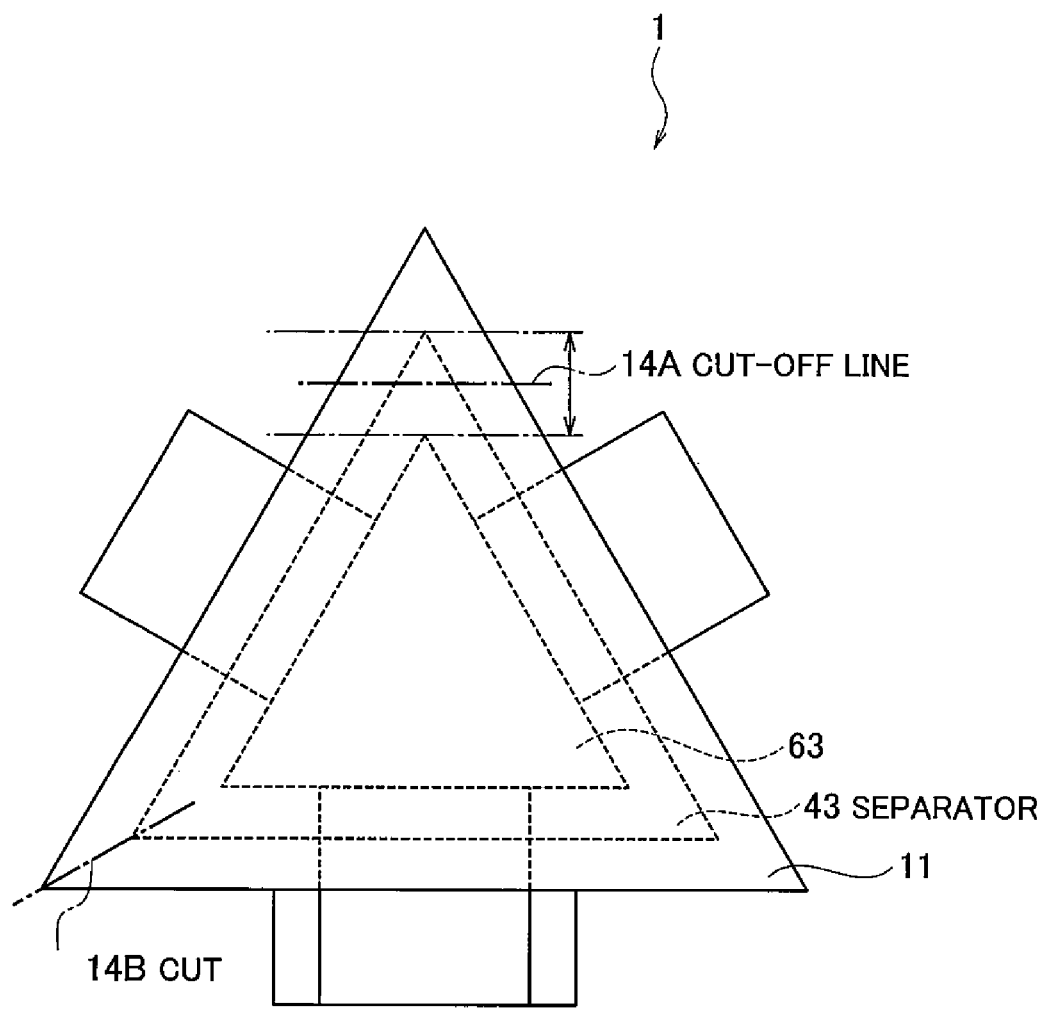
FIG. 13 is an explanatory diagram for explaining cutting positions of a triangular assembled battery in modification 2.

FIG. 13 is an explanatory diagram for explaining cutting positions for the case in which the user makes the holes 14 and 114 in the triangular assembled battery illustrated in FIG. 1. Here, description will be made for the case of making holes by cutting off a tip end of the assembled battery along a cut-off line 14A and for the case of making holes by making a cut in the assembled battery 1 along a cut line 14B. Since the holes need to be made in the separators 41, 42, and 433, it is desirable that the cut-off line 14A be inside the separators 41, 42, and 43, in other words, at a position that allows the separators to be cut (lower than the top of the separator 43 in the figure), but that the cut-off line 14A be also at a position that does not allow the positive electrodes and the negative electrodes to be cut. With this configuration, holes are made in the separating films 71 and 72 and the exterior films 10 and 11. Alternatively, holes may be made in the separating films 71 and 72 and the exterior films 10 and 11 by making a cut in a tip end of the assembled battery along the cut line 14B. It is also desirable that the cut line 13B be inside the separators, in other words, at a position that allows the separators to be cut, but that the cut line 13B be at a position that does not allow the positive electrodes and the negative electrodes to be cut.

Figure 14:
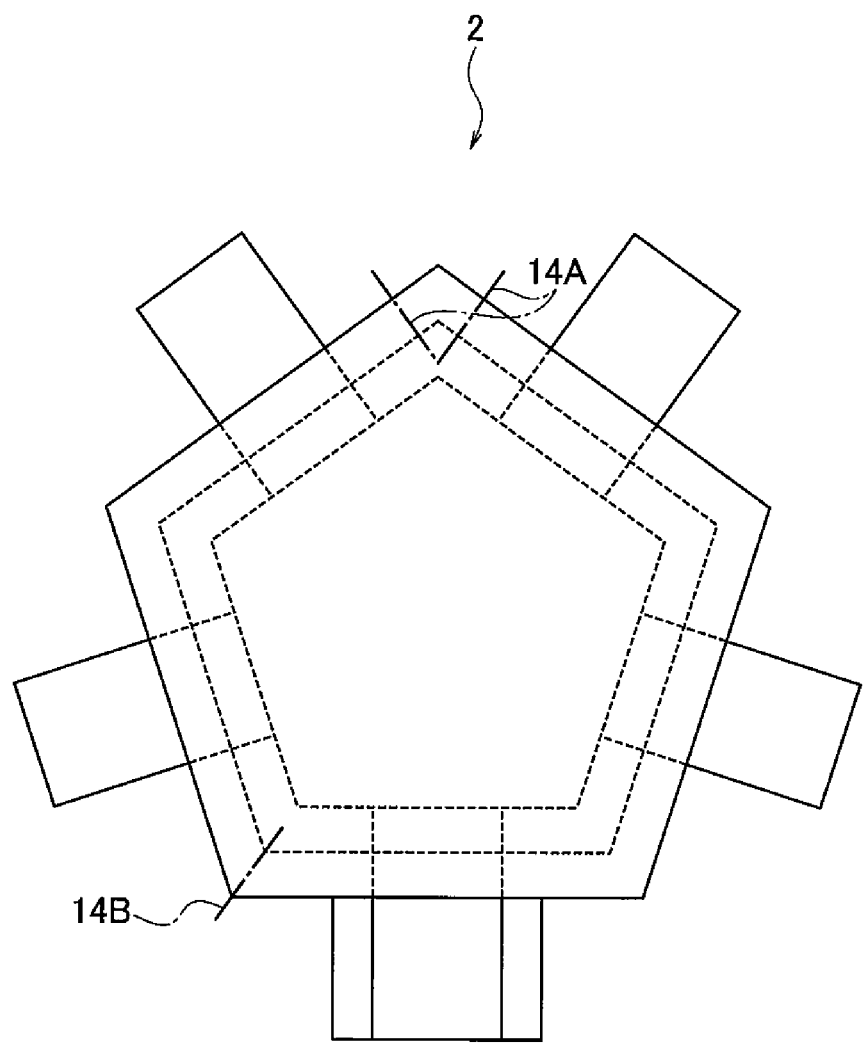
FIG. 14 is an explanatory diagram for explaining cutting positions of a pentagonal assembled battery in modification 2.
Figure 15:
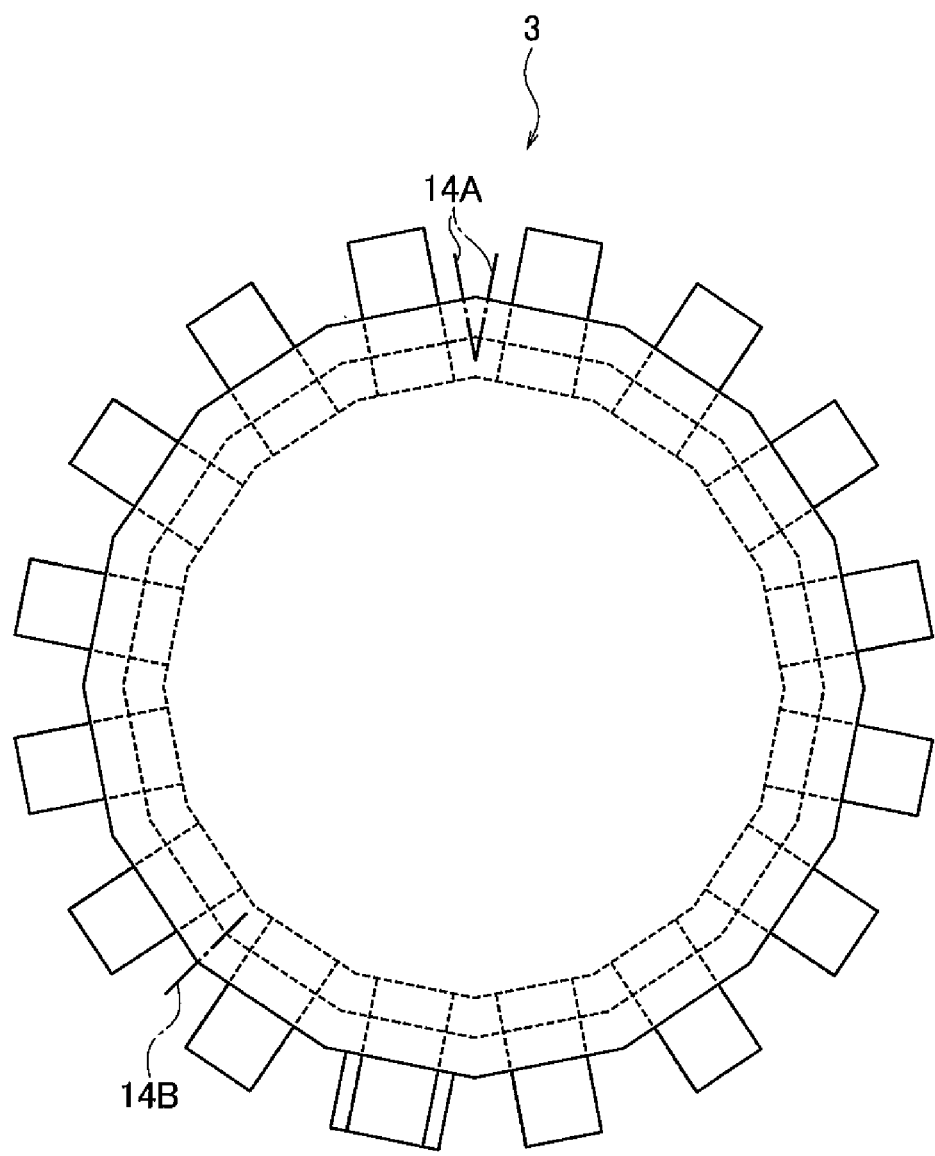
FIG. 15 is an explanatory diagram for explaining cutting positions of a hexadecagonal assembled battery in modification 2.

FIG. 14 is a diagram illustrating an example of a cut-off line 14A and a cut line 14B for the pentagonal assembled battery illustrated in FIG. 4. FIG. 15 is a diagram illustrating an example of a cut-off line 14A and a cut line 14B for the hexadecagonal assembled battery illustrated in FIG. 6.
Modification 3

Figure 16:
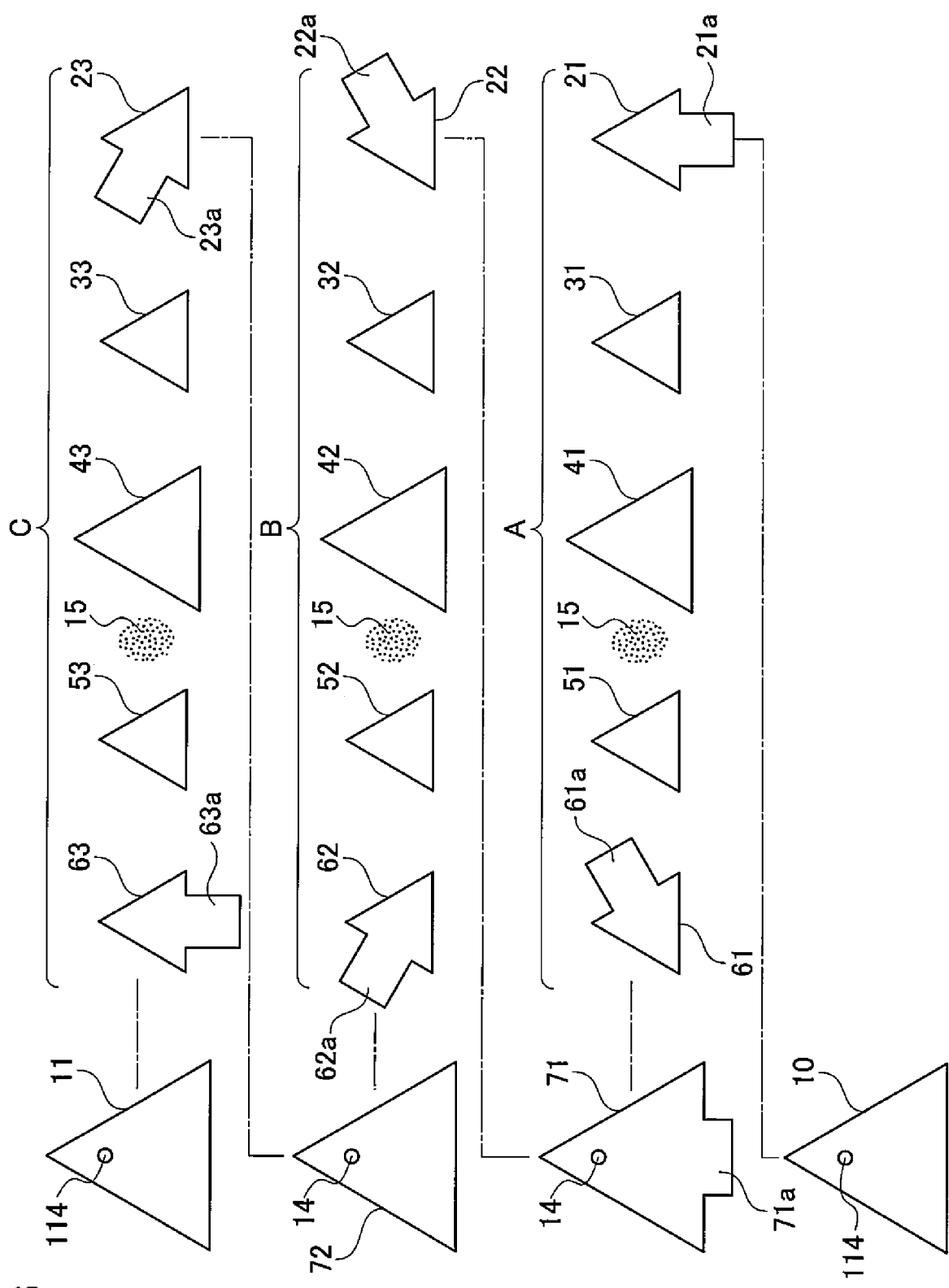
FIG. 16 is a diagram illustrating an example of a hole of separating films in modification 3.

FIG. 16 is a diagram illustrating an example of holes of the separating films 71 and 72 in modification 3. The assembled battery according to the present modification has an electrolyte 15 inside the assembled battery and is different from that according to modification 2 in that a solvent is put in through the holes (liquid holes) 14 and 114. The other configuration is the same as or a similar to that of modification 2. For the solvent, for example, water or the like can be used. Although the electrolyte 15 is disposed between the separator 41, 42, or 43 and the negative electrode 51, 52, or 53 in the illustrated example, the arrangement is not limited to this example. Here, it is desirable that the electrolyte 15 be at positions that allows the electrolyte 15 to be in contact with the separators. Although each flat battery has the electrolyte 15 in the illustrated example, the assembled battery may have a configuration in which the electrolyte 15 is disposed at one place as the entire assembled battery.

The electrolyte 15 may be any substance that allows metal ions and hydroxide ions to move between the positive electrodes and the negative electrodes. The electrolyte 15 is not limited to any specific materials. It is preferable that the electrolyte 15 be composed of, for example, a chloride, such as hydrochloric acid, sodium chloride, potassium chloride, or magnesium chloride; an acetate, such as acetic acid, sodium acetate, potassium acetate, magnesium acetate anhydrous, or magnesium acetate tetrahydrate; a citrate, such as citric acid, sodium citrate, potassium citrate, or magnesium citrate; a carbonate, such as sodium carbonate, potassium carbonate, or magnesium carbonate; a pyrophosphate, such as sodium pyrophosphate, potassium pyrophosphate, or magnesium pyrophosphate; a metaphosphate, such as sodium metaphosphate, potassium phosphate, or magnesium metaphosphate; a hydroxide, such as sodium hydroxide, potassium hydroxide, or magnesium hydroxide; and in addition, ammonium salt, phosphoric acid, phosphate, carbonic acid, HEPES (4-(2-hydroxyethyl)-1-piperazineethanesulfonic acid), or the like.

The separating films 71 and 72 according to the present modification have at least one hole 14 (liquid hole) through which a solvent is put in. The exterior films 10 and 11 also have at least one hole 114 (liquid hole) through which the solvent is put in. In the present modification, when the user uses the assembled battery, the user puts a solvent through the holes 14 and 114 and impregnates it into the assembled battery. The solvent flows into the assembled battery, and the assembled battery starts power generation or electrical discharge. This configuration prevents the occurrence of problems that would occur before the user uses the assembled battery, such as a shortage of the electrolytic solution due to the volatilization, corrosion of positive and negative electrodes, and self-discharging. The holes 14 and 114 may be formed in advance in the separating films 71 and 72 and the exterior film 11 as illustrated in FIG. 16. Alternatively, the assembled battery may have a configuration in which when the user uses the assembled battery, the user cuts a tip end of the assembled battery with scissors, a cutter, or the like to make the holes 14 and 114. The cut-off line 14A and the cut line 14B in the present modification are the same as or a similar to those illustrated in FIGS. 13 to 15, and hence description thereof is omitted.

EXPLANATION OF THE REFERENCE NUMERALS 1, 2, 3 assembled battery
10, 11 exterior film
21, 22, 23 positive-electrode current collector
21a, 22a, 23a positive-electrode terminal
31, 32, 33 positive electrode
41, 42, 43 separator
51, 52, 53 negative electrode
61, 62, 63 negative-electrode current collector
61a, 62a, 63a negative-electrode terminal
71, 72 separating film
71a insulating portion
A to P flat battery
AB, BC junction
112 sealing seal
13, 14, 111, 114 hole
15 electrolyte

The invention claimed is:

1. An assembled battery comprising
stacked N flat batteries, N being an integer of 3 or more, wherein
each of the flat batteries has a positive-electrode terminal and a negative-electrode terminal having an angle of 360°/N in between, and
the N flat batteries are electrically connected in series so that when the stacked N flat batteries are horizontally disposed, the positive-electrode terminal of a first flat battery and the negative-electrode terminal of a last flat battery of the stacked N flat batteries are vertically overlapping and are in parallel alignment.

2. The assembled battery according to claim 1, wherein
the flat battery is N-sided polygonal, and
the positive-electrode terminal and the negative-electrode terminal extend from different sides of the flat battery.

3. The assembled battery according to claim 1, comprising
separating films each disposed between each pair of adjacent ones of the N flat batteries to separate the pair of adjacent flat batteries.

4. The assembled battery according to claim 3, wherein
one of the separating films has an insulating portion that is associated with a positive-electrode terminal of one flat battery of the stacked assembled battery, that has a width larger than the width of the positive-electrode terminal, and that extends outward.

5. The assembled battery according to claim 1, wherein
a positive electrode and a negative electrode of each flat battery has a planar shape of a regular N-sided polygon.

6. The assembled battery according to claim 3, comprising
an exterior film bounding the stacked N flat batteries, wherein
the exterior film and the separating films each have a hole extending therethrough.

7. The assembled battery according to claim 6, comprising
a sealing seal that covers the hole of the exterior film, wherein
when the sealing seal is peeled off, air flows in through the hole, and the assembled battery starts electrical discharge.

8. The assembled battery according to claim 6, wherein
when an electrolytic solution or a solvent is put in through the hole, the assembled battery starts electrical discharge.

9. The assembled battery according to claim 3, wherein
one of the separating films has an insulating portion that projects between the positive-electrode terminal of the first flat battery and the negative-electrode terminal of the last flat battery so as to separate the positive-electrode terminal of the first flat battery from the negative-electrode terminal of the last flat battery.

10. The assembled battery according to claim 9, wherein
the insulation portion of the one of the separating films has a width larger than a width of the positive-electrode terminal.

11. The assembled battery according to claim 1, wherein the stacked N flat batteries are disposed between opposing sheets of film that are bound together, at least one of the opposing sheets of film having a linear cut-line markings formed thereon.

12. The assembled battery according to claim 11, wherein each N flat battery comprises:
a separator;
a negative electrode current collector;
a negative electrode disposed between the separator and the negative electrode current collector;
a positive electrode current collector; and
a positive electrode disposed between the separator and the positive electrode current collector, the positive electrode and the negative electrode being disposed on opposing sides of the separator,
wherein the linear cut-line marking inwardly extends from a perimeter edge of the at least one of the opposing sheets of film but does not overlay the separator.

13. The assembled battery according to claim 11, wherein each N flat battery comprises:
a separator;
a negative electrode current collector;
a negative electrode disposed between the separator and the negative electrode current collector;
a positive electrode current collector; and
a positive electrode disposed between the separator and the positive electrode current collector, the positive electrode and the negative electrode being disposed on opposing sides of the separator,
wherein the linear cut-line marking inwardly extends from a perimeter edge of the at least one of the opposing sheets of film and overlays at least a portion the separator.

14. The assembled battery according to claim 6, wherein each N flat battery comprises:
a separator;
a negative electrode current collector;
a negative electrode disposed between the separator and the negative electrode current collector;
a positive electrode current collector; and
a positive electrode disposed between the separator and the positive electrode current collector, the positive electrode and the negative electrode being disposed on opposing sides of the separator,
wherein each hole extending through the separating films is positioned so that each hole does not overly the separators but is disposed outwardly away from each separator.

15. The assembled battery according to claim 1, wherein each N flat battery comprises:
a separator;
a negative electrode current collector;
a negative electrode disposed between the separator and the negative electrode current collector;
a positive electrode current collector; and
a positive electrode disposed between the separator and the positive electrode current collector, the positive electrode and the negative electrode being disposed on opposing sides of the separator, the positive electrode having an inside face facing the separator and an opposing outside face,
wherein the positive electrode current collector comprises:
a body overlaying the outside face of the positive electrode, the body having a polygonal shape with opposing side faces that extend to an encircling perimeter edge, the perimeter edge being comprised of a plurality of interconnected linear side edges each having a length; and
the positive-electrode terminal outwardly projecting from a select one of the linear side edges of the body, the positive-electrode terminal having a width extending along the select linear side edge that is shorter than the length of the select linear side edge.

16. The assembled battery according to claim 15, wherein the separator, negative electrode, the positive electrode, and the body of the positive electrode current collector each have the same polygonal shape.

17. The assembled battery according to claim 15, wherein the body of the positive electrode current collector completely covers the outside face of the positive electrode.

18. The assembled battery according to claim 3, wherein one of the separating films comprises:
a body having a polygonal shape with opposing side faces that extend to an encircling perimeter edge, the perimeter edge being comprised of a plurality of interconnected linear side edges each having a length; and
an insulating portion outwardly projecting from a select one of the linear side edges of the body, the insulating portion having a width extending along the select linear side edge that is shorter than the length of the select linear side edge.

19. The assembled battery according to claim 18, wherein each N flat battery comprises:
a separator;
a negative electrode current collector;
a negative electrode disposed between the separator and the negative electrode current collector;
a positive electrode current collector; and
a positive electrode disposed between the separator and the positive electrode current collector, the positive electrode and the negative electrode being disposed on opposing sides of the separator,
wherein the separator, the negative electrode, the positive electrode and the body of the one of the separating films each have the same polygonal shape.

* * * * *